UNITED STATES PATENT OFFICE.

SAMUEL S. RUSTON AND BENJAMIN RUSTON, OF SYRACUSE, NEW YORK.

WATER-PAINT.

SPECIFICATION forming part of Letters Patent No. 732,894, dated July 7, 1903.

Application filed June 9, 1902. Serial No. 110,750. (No specimens.)

*To all whom it may concern:*

Be it known that we, SAMUEL S. RUSTON and BENJAMIN RUSTON, of Syracuse, in the county of Onondaga in the State of New York, have invented new and useful Improvements in the Composition in Water-Paints and Methods of Producing the Same, of which the following is a full, clear, and exact description.

This invention relates to improvements in the composition in water-paints and method of producing the same.

Our object is to produce such a composition which may be used for either indoor or outdoor work, cheap and durable, and the further object of producing the same by an inexpensive method.

Our invention consists in the several ingredients hereinafter specified mixed and commingled together by a process and method hereinafter set forth, and to that end our invention consists in combining the several ingredients hereinafter specified and in the several new and novel steps constituting our process hereinafter described, and which are set forth in the claims hereunto annexed.

We have found by experiments that by combining common cheese-curd, wet or dried, with oil or fat in an intimately and finely-divided state such composition being mixed with an alkaline solvent and mixed up with water produces a tough waterproof film. We mix this composition with lime slaked with a solution of alumina sulfate and have as a result a composition which when mixed with water forms on drying our waterproof-paint adhesive mixture, which is adapted for sizing, wall-coating, &c.

The following are substantially the proportions used to produce our composition, although we do not limit ourselves to these exact amounts, as they may be varied according to the use to which the composition is to be put. Ordinarily, however, we combine fifty per cent. of casein with an equal amount of hydrocarbon substances, such as oil or fat. The solution used to slake the lime with alumina sulfate comprises about ninety per cent. of lime and ten per cent. of alumina sulfate with the usual amount of water—that is, sufficient water to completely hydrate the CaO. These freshly-precipitated bodies render the hydrocarbon substances present with the casein quite insoluble when dried.

The following is the formula of the reaction of the alumina sulfate and lime composition:

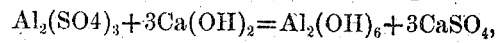

$$Al_2(SO4)_3 + 3Ca(OH)_2 = Al_2(OH)_6 + 3CaSO_4,$$

but under no circumstances must sufficient alumina sulfate be used to convert all the calcium hydroxid into sulfate.

In carrying out our process we take the following steps: We first prepare an emulsion of oil or fat. We then add this to skimmed milk and heat to about 110° to 130° Fahrenheit, and then add an acid, such as sulfuric acid. The acid neutralizes the alkali and deposits the oil or fat or their acids in a minutely-subdivided state, after which the curd and whey are separated, and after drawing off the whey the mass of composition is washed and dried. The curd compound thus obtained is further compounded with a solvent, such as alkali or alkaline earths, which we treat or mix with a suitable salt, the salt having the property to fix the curd and the oily or fatty matter in the final drying of the paint or size. We have found that this is satisfactorily accomplished by the use of alumina sulfate. We, therefore, combine burnt lime with alumina sulfate. We slake the lime or add a solution of alumina sulfate thereto. A chemical action takes place then, and the lime compound is thus made a fixing agent for the oily or fatty salts in combination with the curd, the two mixtures in the final product being in about equal proportions. This composition may also be mixed with mineral matter, metallic oxid, coloring, &c., as desired. These ingredients are then dried and finely ground and when mixed with water produce a superior adhesive size or wall coating or paint.

Having described our invention, what we now claim, and desire to secure by Letters Patent, is—

1. The herein-described composition consisting of milk albuminoid, oily substances, lime, alumina hydroxid and calcium sulfate.

2. The herein-described composition consisting of milk albuminoids, oily or fatty substances emulsified, lime, alumina hydroxid and calcium sulfate.

3. The herein-described composition consisting of milk albuminoids, oily or fatty substances, lime, alumina hydroxid, calcium sulfate and a filler of mineral matter in a finely-divided state.

4. The herein-described process for producing paints comprising the following steps: first emulsifying the oily or fatty substances, mixing it with skimmed milk, adding diluted acid to precipitate the casein and fatty substances, separating it from the whey, then washing the curd compound, then drying and pulverizing, then mixing with the lime compound obtained by slaking the lime with the solution of alumina sulfate.

5. The herein-described process for producing paints comprising the following steps: first emulsifying the oily or fatty substances, mixing it with skimmed milk, adding diluted acid to precipitate the casein and fatty substances, separating it from the whey, then washing the curd compound, then drying and pulverizing, then mixing with the lime compound obtained by slaking the lime with the solution of alumina sulfate and adding mineral matter in its finely-divided state.

In witness whereof we have hereunto set our hands on this 6th day of June, 1902.

SAMUEL S. RUSTON.
BENJAMIN RUSTON.

Witnesses:
JESSIE M. HAMMEKEN,
HOWARD P. DENISON.